(12) United States Patent
Zhang et al.

(10) Patent No.: US 9,500,871 B2
(45) Date of Patent: Nov. 22, 2016

(54) PARALLAX BARRIER, DISPLAY PANEL AND METHOD OF MANUFACTURING A PARALLAX BARRIER

(75) Inventors: Zhuo Zhang, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 809 days.

(21) Appl. No.: 13/338,406

(22) Filed: Dec. 28, 2011

(65) Prior Publication Data

US 2012/0170115 A1 Jul. 5, 2012

(30) Foreign Application Priority Data

Dec. 31, 2010 (CN) .................... 2010 1 0620633

(51) Int. Cl.
*G02B 27/22* (2006.01)
*G02B 27/26* (2006.01)

(52) U.S. Cl.
CPC ........... *G02B 27/2214* (2013.01); *G02B 27/26* (2013.01)

(58) Field of Classification Search
CPC ...................................... G02B 27/22–27/2264
See application file for complete search history.

(56) References Cited

U.S. PATENT DOCUMENTS

| | | | |
|---|---|---|---|
| 7,002,721 B2* | 2/2006 | Arai et al. | 359/265 |
| 7,154,574 B2* | 12/2006 | Battersby | 349/106 |
| 7,839,564 B2* | 11/2010 | Whitesides et al. | 359/315 |
| 8,786,932 B2* | 7/2014 | Copeland et al. | 359/269 |
| 2006/0215262 A1 | 9/2006 | Kim | |
| 2009/0051835 A1 | 2/2009 | Park et al. | |
| 2009/0091815 A1 | 4/2009 | Shiu et al. | |
| 2009/0244441 A1* | 10/2009 | Nagato et al. | 349/78 |
| 2010/0201790 A1* | 8/2010 | Son | G02B 27/2264 348/53 |
| 2011/0157171 A1* | 6/2011 | Lin | 345/419 |
| 2012/0019890 A1* | 1/2012 | Yeh et al. | 359/273 |
| 2012/0081773 A1* | 4/2012 | Yeh et al. | 359/265 |
| 2013/0038966 A1* | 2/2013 | Sasaki et al. | 360/123.04 |

FOREIGN PATENT DOCUMENTS

| | | |
|---|---|---|
| CN | 20140237 Y | 2/2010 |
| JP | 08-076058 A | 3/1996 |
| JP | 2005-134689 A | 5/2005 |
| JP | 2006-189766 A | 7/2006 |
| JP | 2008-185629 A | 8/2008 |
| JP | 2009-053391 A | 3/2009 |
| JP | 2009-053645 A | 3/2009 |
| JP | 2009-230084 A | 10/2009 |
| KR | 20070097815 A | 10/2007 |

OTHER PUBLICATIONS

Chinese Rejection Decision dated Jul. 3, 2014; Appln. No. 201010620633.4.
First Chinese Office Action dated Mar. 26, 2013; Appln. No. 201010620633.4.
Second Chinese Office Action dated Jan. 3, 2014; Appln. No. 201010620633.4.
Japanese Office Action dated Aug. 3, 2015; Appln. No. 2011-288056.
Japanese Office Action dated Feb. 22, 2016; Appln. No. 2011-288056.

\* cited by examiner

*Primary Examiner* — Derek S Chapel
(74) *Attorney, Agent, or Firm* — Ladas & Parry LLP

(57) ABSTRACT

The disclosure provides a display panel comprising a parallax barrier capable of working with natural light, and the parallax barrier comprises transparent barrier provided with at least one set of pattern which is capable of switching between a light-absorbing state and a light-transmitting state, wherein when the set of pattern is the light-absorbing state, a slit grating for 3D display is formed on the transparent barrier.

11 Claims, 6 Drawing Sheets

Left-eye image frame

Right-eye image

PARALLAX BARRIER, DISPLAY PANEL AND METHOD OF MANUFACTURING A PARALLAX BARRIER

BACKGROUND

Embodiments of the disclosed technology are related to a parallax barrier, a display panel and a method of manufacturing a parallax barrier.

In a conventional 3D (three-dimension) display technology, generally a parallax barrier 12 is provided in front of a display panel 11 on the display side. The schematic view of the display principle is shown in FIG. 1, in which the parallax barrier 12 is provided with a slit grating, the image displayed by the pixel units of the display panel 11 passes trough the slits on the parallax barrier 12 and is transmitted to the observation point (i.e., human eyes). It can be seen from FIG. 1 that the pixel units of the display panel which can be viewed by the left eye 13 are different from those which can be viewed by the right eye 14, thus the viewer can respectively receive two different images in the two different eyes at the observation point, and the two different images are synthesized to form 3D display by the viewer. A conventional parallax barrier is typically manufactured with a fixed pattern or with a liquid crystal panel.

SUMMARY

Embodiments of the disclosure provides a parallax barrier, a display panel comprising the same and a method of manufacturing the, and the parallax can realize switch between 2D display and 3D display with natural light rather than polarized light.

An embodiment of the disclosure provides a parallax barrier capable of working with natural light, comprising a transparent barrier provided with at least one set of pattern which is capable of switching between a light-absorbing state and a light-transmitting state, wherein when the set of pattern is the light-absorbing state, a slit grating for 3D display is formed on the transparent barrier.

Another embodiment of the disclosure provides a display panel, comprising a display unit, wherein a display surface of the display unit is provided with the above-described parallax barrier.

Further another embodiment of the disclosure provides a method of manufacturing a parallax barrier capable of working with natural light, comprising: forming transparent electrodes on two transparent substrates respectively, wherein transparent electrodes on at least one of the transparent substrates comprise a set of patterned electrodes or at least two sets of patterned electrodes, each set of which can be energized independently; assembling together the two transparent substrates formed with the transparent electrodes to form a cell, and filling liquid medium between the assembled transparent substrates, wherein when each set of the patterned electrodes are energized, the liquid medium in the regions corresponding to the energized patterned electrodes is changed into the non-transparency state, forming a light-absorbing state pattern having the same shape of the energized patterned electrode, or vice versa.

In the parallax barrier capable of working with natural light, the display panel, and the method of manufacturing a parallax barrier according to the embodiment of the disclosure, the pattern of the parallax barrier can be present the light-absorbing state and the light-transmitting state and is switchable between the light-absorbing state and the light-transmitting state by control. When naked-eye 3D display is needed, the pattern of the parallax barrier can be controlled to switch to the light-absorbing state, obtaining naked-eye 3D display; when 2D display is needed, the pattern of the parallax barrier can be controlled to switch to the light-transmitting state, obtaining 2D display. Therefore, with the embodiments of the disclosure, switch between 2D display and 3D display can be realized with natural light rather than polarized light.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

Figure 1:
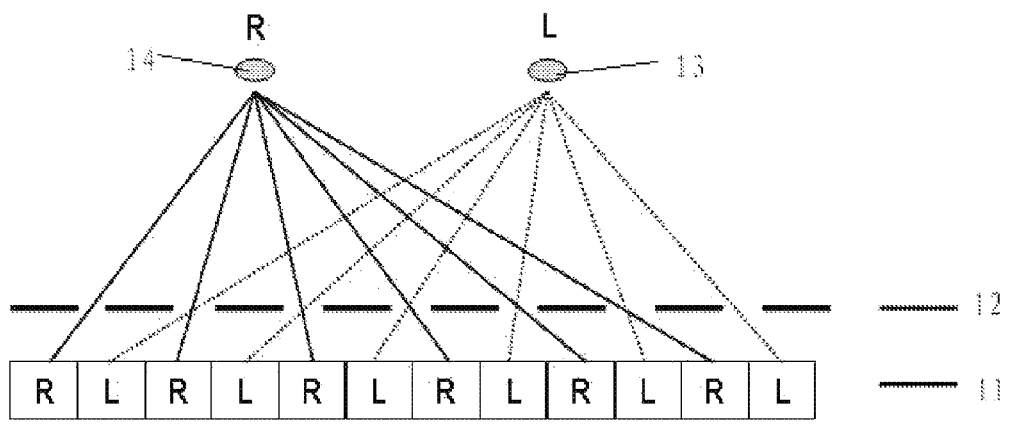
FIG. 1 shows a principle of naked-eye 3D display in the related art.

In implementing 3D display with the technology as shown in FIG. 1, the inventors note the following problems: in the case of the parallax barrier with a fixed pattern, after the parallax barrier is placed in front of a display panel, the display panel can only conduct 3D display but cannot any more switch to 2D (two-dimension) display; on the other hand, in the case of the parallax barrier with a liquid crystal panel, although the display panel can switch to 2D display by controlling the transparency state of the liquid crystal material in the liquid crystal panel, the light source of the display panel should emit polarized light, thus for the display panel with a normal light source that does not emit polarized light, switching to 2D display cannot be obtained.

An embodiment of the disclosure provides a parallax barrier capable of working with natural light, which comprises a transparent barrier, at least one set of pattern that is provided on the transparent barrier and capable of switching between a light-absorbing state and a light-transmitting state, and when the set of pattern on the transparent barrier is in the light-absorbing state, a slit grating for naked-eye 3D display can be formed on the transparent barrier.

When the set of pattern in the embodiment of the disclosure is in the light-transmitting state, one exemplary state of the transparent barrier is a transparency state as a whole (that is, the entire transparent barrier become transparent), the corresponding transparency of the patterns is generally over 80%, and more preferably over 92%. When the set of pattern is in the light-absorbing state as a whole, the corresponding transparency of the patterns is generally lower than 20%, and for the purpose of better 3D display effect, the transparency in the region corresponding to the patterns is lower than 8% for example; besides the regions corresponding to the patterns which become light-absorbing, the other regions can keep the original transparency that is close to the light-transmitting state.

With the parallax barrier of the embodiment of the disclosure, where naked-eye 3D display is in need, the patterns in the parallax barrier can be controlled to switch to the light-absorbing state, functioning as an existing parallax barrier to realize naked-eye 3D display; where 2D display is in need, the patterns in the parallax barrier can be controlled to switch to the light-transmitting state and become transparent as a whole to realize 2D display. In the embodiment of the disclosure, without polarized light, switching between 2D display and 3D display can be realized with a normal light source. Furthermore, in the embodiment of the disclosure, one or more above parallax barriers can be provided on the display side of a display unit to produce a display panel that can switch between 2D display and 3D display.

To make objectives, technical solutions and advantages provided by embodiments of present disclosure more clearly, a clear and full description will be made to the technical solutions of embodiments of present disclosure hereinafter in connection with the accompanying drawings of present embodiments. Apparently, rather than all the embodiments, embodiments to be described is only a part of embodiments of present disclosure. Based on the embodiments of present disclosure, all the other embodiments acquired by those skilled in the art without making creative work belong to the scope claimed by present disclosure

First Embodiment

The first embodiment of the disclosure provides a parallax barrier capable of working with natural light comprising a transparent barrier, at least one set of pattern that is provided on the transparent barrier and capable of switching between a light-absorbing state and a light-transmitting state, and when the set of pattern on the transparent barrier is in the light-absorbing state, a slit grating for naked-eye 3D display can be formed on the transparent barrier.

Figure 2:
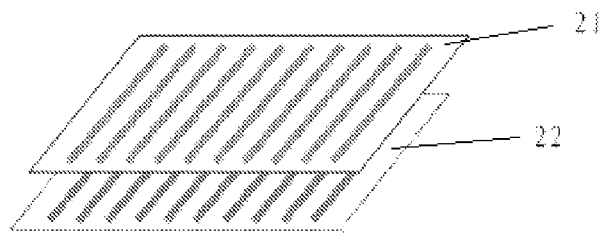
FIG. 2 shows a diagram of a parallax barrier according to a first embodiment of the disclosure.
Figure 3A:
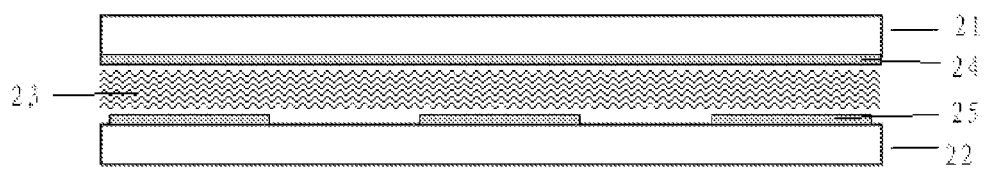
FIG. 3a shows a cross-sectional view of the parallax barrier according to the first embodiment of the disclosure.

As shown in FIG. 2 and FIG. 3a, the transparent barrier of the embodiment of the disclosure comprises two transparent substrates 21 and 22 that are assembled together to oppose each other and a layer of transparent liquid medium 23 that is filled between the two transparent substrates 21 and 22; the two transparent substrate can be assembled with sealant to prevent the transparent liquid medium filled therebetween from leaking out, and further spacers can be used to control the gap (or space) between the transparent substrates after assembly. Or, the filled liquid medium 23 may be not transparent when no electric filled is applied thereto but change to be transparent when an electric field is applied thereto. In order to form the slit grating for naked-eye 3D display on the transparent barrier, the embodiment of the disclosure provides transparent electrodes 24 and 25 on the two transparent substrates respectively; the transparent electrodes on at least one of the transparent substrates are a set of patterned electrodes to form one set of pattern, or the transparent electrodes on at least one of the transparent substrate are two sets of transparent electrodes to form two sets of pattern, which can be energized separately and independently. The spacers may be ball spacers and post spacers for example.

In the embodiment of the disclosure, the liquid medium in the regions corresponding to the patterned electrodes can be in a light-absorbing state or a light-transmitting state under different conditions (e.g., chemical conditions), so that a slit grating for naked-eye 3D display can be formed on the transparent barrier.

The methods to provide the transparent electrodes comprise, but not limited to, the following examples.

1) As shown in FIG. 2 and FIG. 3a, the transparent electrodes on one of the transparent substrates are a set of patterned electrodes, and these patterned electrodes comprise electrodes that are in parallel to each other, and the widths of the electrodes and the intervals between adjacent electrodes are in accordance with the conditions of a slit grating for naked-eye 3D display. Therefore, if the set of patterned transparent electrodes are energized, the regions corresponding to the energized patterned electrodes are changed to a non-transparency state due to chemical reaction or physical transformation, resulting in a light-absorbing state patterns which are the same as those of the energized patterned electrodes; and this light-absorbing state patterns form a slit grating for naked-eye 3D display with cooperation of other transparent regions.

Figure 3B:
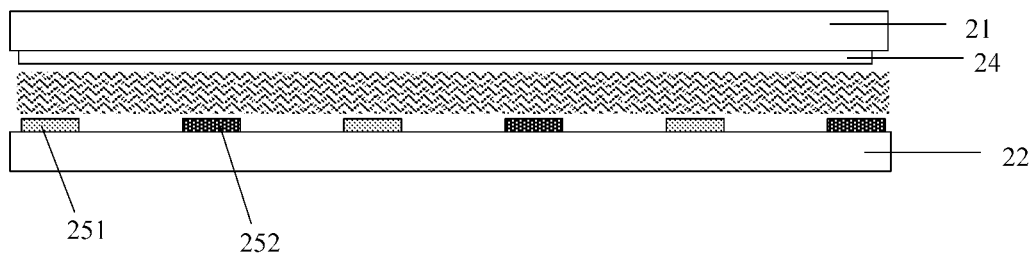
FIG. 3b shows a cross-sectional view of still another parallax barrier according to the first embodiment of the disclosure.

2) the transparent electrodes on one of the transparent substrates comprise at least two set of patterned electrodes which can be energized independently (as shown in FIG. 3b). With this configuration, one set of patterned electrodes 251 comprise electrodes that are in parallel to each other, and the widths of the electrodes and the intervals between adjacent electrodes are in accordance with the conditions of a slit grating for naked-eye 3D display; further, another set of patterned electrodes 252 are provided respectively in the intervals of adjacent patterned electrodes of the previous set of patterned electrodes and can be energized independently from the previous set of patterned electrodes, and also the widths of the electrodes and the intervals between adjacent electrodes in this set of patterned electrodes are in accordance with the conditions of a slit grating for naked-eye 3D display. Similar to the first example, when one set of the patterned electrodes are energized, the transparent barrier can form a slit grating for naked-eye 3D display. In this example, because there are two or more sets of patterned electrodes and these sets of patterned electrodes can be used to form different slit gratings, the parallax barrier according to the embodiment of the disclosure can provide different desirable observation points; or, the two or more sets of patterned electrodes can be energized alternatively to provide a slit grating at a time where the liquid medium is non-transparent without application of electric field.

Figure 4:
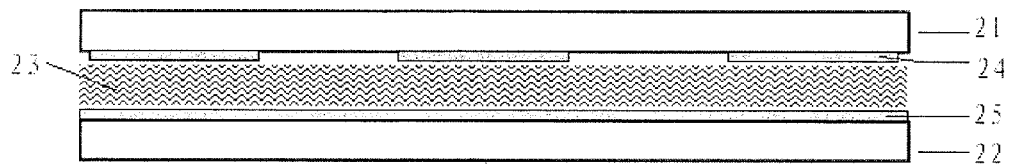
FIG. 4 shows a cross-sectional view of another parallax barrier according to the first embodiment of the disclosure.
Figure 5:
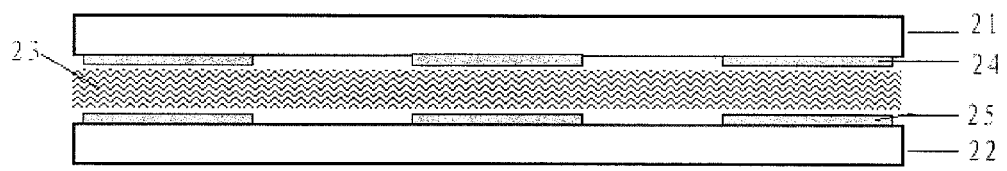
FIG. 5 shows a cross-sectional view of still another parallax barrier according to the first embodiment of the disclosure.

In the above two examples, the transparent substrate that is provided with the patterned electrodes can be the upper substrate or the lower substrate, and please refer to the implementation examples as shown in FIG. 3a and FIG. 4. Further, the transparent electrode(s) on the other transparent substrate of the two transparent substrates may be an electrode in plate that covers the entire transparent substrate in the embodiment of the disclosure (as shown in FIG. 3a and FIG. 4), or may be patterns corresponding to the patterned electrode on the opposing substrate (as shown in FIG. 5).

In the embodiment of the disclosure, the regions corresponding to the patterned electrodes of the parallax barrier can switch between a light-transmitting state and a light-absorbing state by controlling the energizing and de-energizing of the patterned electrodes. For example, the two following examples can be adopted.

First, when each set of patterned electrodes are energized, the regions corresponding to these patterned electrodes can switch to the non-transparency state, forming a light-absorbing state pattern having the same configuration as that of the patterned electrodes which are energized.

Second, when each set of patterned electrodes are de-energized, the regions corresponding to these patterned electrodes can switch to the non-transparency state, forming a light-absorbing state pattern having the same configuration as that of the patterned electrodes which are de-energized.

In order to realize the switch of the regions of the parallax barrier corresponding to the patterned electrodes between the light-transmitting state and the light-absorbing state, the embodiment of the disclosure can adopt, but not limited to, an electrowetting method, an electrochromic method, or an electrochemistry deposition method. In the following, the methods will be described in principle.

Electrowetting Method

In this electrowetting method, the transparent liquid medium may comprise colored oil drops and transparent solution; the colored oil drops for example may be black oil drops, the material of which include alkane, silicon oil, or a combination thereof for example, and the transparent solution for example may be colorless water, salt solution, ethanol, or any combination thereof for example; further, a medium layer that can produce electrowetting effect with the transparent liquid medium is provided on the patterned electrodes, and this medium layer can be a insulation layer with a hydrophobic surface, such as teflon.

When the patterned electrodes are not energized, because the sum of the interfacial tension between the oil drops and the water and the interfacial tension between the oil drops and the hydrophobic surface of the insulation layer is less than the interfacial tension between the water and the hydrophobic surface of the insulation layer, the oil drops automatically spread flatly on the hydrophobic surface of the insulation layer in accordance with minimum energy principle of systemic stability, which makes the transparent liquid medium in the regions corresponding to the patterned electrodes, which are not energized, switched to the non-transparency state, resulting in the light-absorbing state pattern having the same configuration as that of the patterned electrodes which are not energized. In an example, the transparent barrier according to the disclosure comprises two sets of patterned electrode that can be controlled independently and together occupy the whole display area of the transparent barrier; when both the two sets of patterned electrode are energized, the transparent barrier become transparent as a whole for 2D display, and on the other hand, when one set of patterned electrode is de-energized, the transparent barrier become a parallax barrier for 3D display.

When the patterned electrodes are energized, the original balanced state is broken, the oil drops plump out, which reduces the contact surface between the oil drops and the hydrophobic surface of the insulation layer, thus the transparent liquid medium in the regions corresponding to the patterned electrodes, which are energized, is transparent for light to pass through, resulting in the light-transmitting state pattern having the same configuration as that of the patterned electrodes which are energized.

Electrochromic Method

In this electrochromic method, the transparent liquid medium may comprise a transparent electrolyte solution and an electrochromic compound that is dissolved in the electrolyte solution. In an embodiment of the disclosure, for example, an organic electrochromic compound (e.g., 4,4'-bipyridinium) can be dissolved in an electrolyte solution. When energized, the organic electrochromic compound can be switched between a colored state and a colorless state based on the principle of electron transfer (deoxidization or oxidization), which makes the regions corresponding to the patterned electrode switchable between the light-transmitting state and the light-absorbing state.

Electrochemistry Deposition Method

In this method, the transparent liquid medium may comprise transparent electrolyte containing metal microparticles. When the patterned electrodes are energized, metal microparticles in the transparent electrolyte can be deposited on the patterned electrodes, which results in a non-transparent (light-absorbing state) pattern.

The transparent electrolyte in an embodiment of the disclosure may comprise at least two components: a reversible reactant and an electrolyte solution. In addition, transparent electrolyte may further comprise other additives such as oxidant, reductant, stabilizer, surfactant, antifreezing fluid, or the like, as desired.

For example, the reversible reactant may be an organic material or inorganic salt. The organic material may be polyaniline, polythiophene, poly-pyrrolidone or derivative thereof; the inorganic salt may be silver (Ag) salt complex compound, silver halide, or the like. The electrolyte solute may be aether, acetonitrile, boron trifluoride-diethyl etherate, dimethylformamide, N-methyl pyrrolidone, tetrahydrofuran, dimethyl sulfoxide, or any combination thereof.

As any of the three exemplary methods is used to realize the switch between the light-transmitting state and the light-absorbing state, in the embodiment of the disclosure, when the set of pattern in the embodiment of the disclosure is in the light-transmitting state, one exemplary state of the transparent barrier is a transparency state as a whole, the corresponding transparency is generally over 80%, and more preferably over 92%, and the transparency can be increased by controlling the time period for energizing or de-energizing of the patterned electrodes in the light-transmitting state, and generally the longer time period in the light-transmitting state is, and the higher transparency can be obtained; when the set of pattern is in the light-absorbing state, the corresponding transparency of the pattern is generally lower than 20%, and for the purpose of a better 3D display effect, the transparency in the regions corresponding to the pattern is lower than 8% for example, the transparency can be decreased by controlling the time period for energizing or de-energizing of the patterned electrodes in the light-absorbing state, and generally the longer time period in the light-absorbing state is, and the lower transparency can be obtained. Besides the regions corresponding to the pattern, the other regions can keep the transparency that is close to that in the light-transmitting state.

Figure 6:
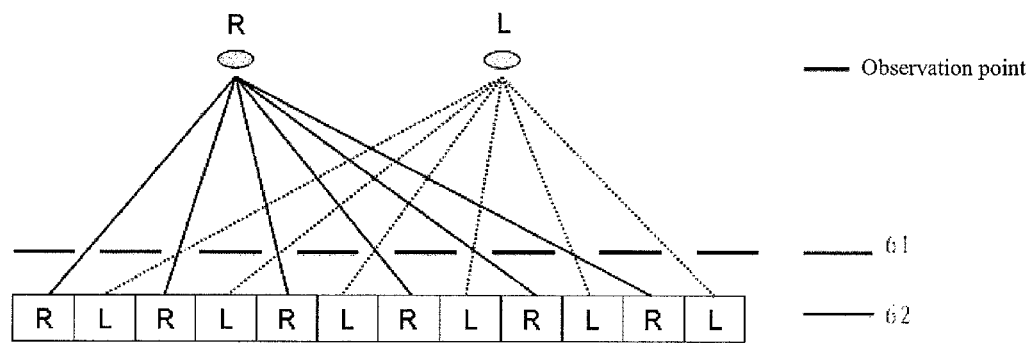
FIG. 6 shows a diagram of naked-eye 3D display realized by the parallax barrier according to the first embodiment of the disclosure.
Figure 7:
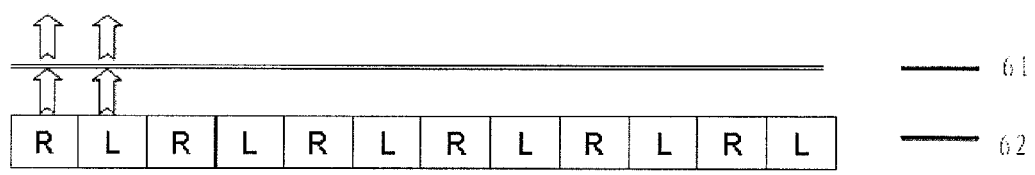
FIG. 7 shows a diagram of 2D display realized by the parallax barrier according to the first embodiment of the disclosure.

The display unit comprises left-eye pixels (L) for left-eye images and right-eye pixels (R) for right-eye images, and with the cooperation of the parallax barrier can realize 2D or 3D display. In the embodiment of the disclosure, as shown in FIG. 6, when naked-eye 3D display is needed, the pattern of the parallax barrier 61 can be controlled to switch to the light-absorbing state to function as an existing parallax barrier, thus the left eye and the right eye of a user at a observation point can watch different images from a display unit 62 and feel a 3D display effect, realizing naked-eye 3D display; as shown in FIG. 7, when 2D display is needed, the pattern of the parallax barrier 61 can be controlled to switch to the light-transmitting state, in which case the left-eye pixels and right-eye pixels are not distinguished from each other and used to display same images, thus the left eye and the right eye of the user at the observation point can watch same images from the display unit 62, realizing 2D display.

Second Embodiment

Figure 8:
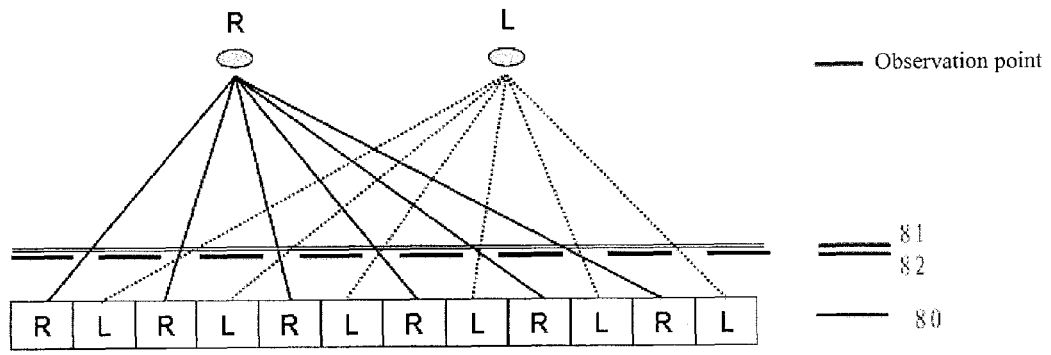
FIG. 8 shows a diagram of naked-eye 3D display realized by a parallax barrier according to a second embodiment of the disclosure.
Figure 9:
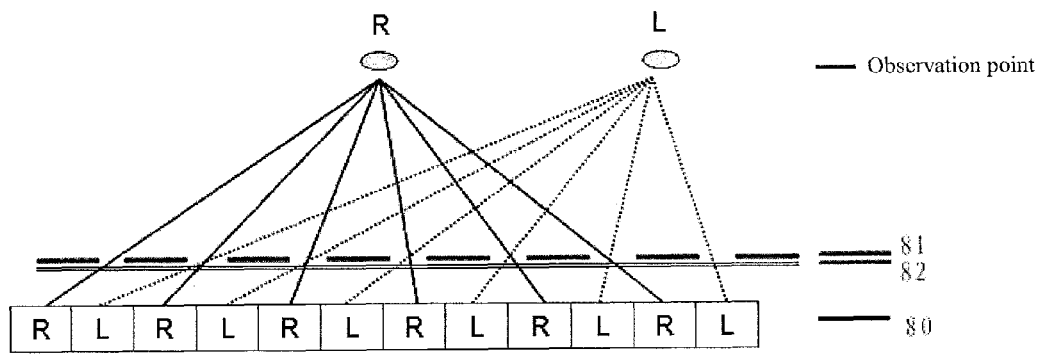
FIG. 9 shows a diagram of naked-eye 3D display realized by another parallax barrier according to the second embodiment of the disclosure.

The second embodiment of the disclosure provides a display panel, as shown in FIG. 8 and FIG. 9, comprising a display unit; on the display surface of the display unit is provided at least one parallax barrier capable of working with natural light, and the specific structure of this parallax barrier can be referred to the above first embodiment, so omitted here for simplicity.

When the display surface of display unit is provided with one parallax barrier, there is one desirable observation point in general. In order to provide a plurality of desirable observation points, the embodiment of the disclosure employs a parallax barrier comprising more than one set of patterned electrodes and can switch among these sets of patterned electrodes to obtain more than one desirable observation points for the display panel. For example, when the parallax barrier renders the regions of the first set of patterned electrodes in the light-absorbing state, it functions as a first kind of slit grating and accordingly provides a first desirable observation point; when the parallax barrier renders the regions of the second set of patterned electrodes in the light-absorbing state, it functions as a second kind of slit grating and accordingly provides a second desirable observation point. From the above, when the parallax barrier presents in different patterns, different desirable observation points are provided.

When the display surface of the display unit 80 are provided with more than one parallax barrier, as shown in FIG. 8 and FIG. 9, for example, the display unit comprises two layers of parallax barriers (that is, the parallax barrier 81 and the parallax barrier 82 shown in FIG. 8 and FIG. 9); these two layers of parallax barriers have different patterned electrode configuration, and can be controlled independently to present in a light-absorbing state and a light-transmitting state. When the parallax barrier 81 is the transparency state, the regions of the patterned electrodes of the parallax barrier 82 are in the light-absorbing state; at this time, the parallax barrier that actually works is the parallax barrier 82, and the corresponding desirable observation point actually is the desirable observation point of the parallax barrier 82. Likewise, when the regions corresponding to the parallax barrier 81 are in the light-absorbing state, the parallax barrier 82 appears in the transparency state; at this time, the parallax barrier that actually works is the parallax barrier 81, and the corresponding desirable observation point actually is the desirable observation point of the parallax barrier 81.

In the case where parallax barriers are provided, each parallax barrier can further comprise sets of patterned electrodes, thus the display panel can have more desirable observation points.

Whether parallax barriers or just one parallax barrier is employed, all the parallax barriers or the parallax barrier is switched to the transparency state, the display panel of the embodiment of the disclosure can realize 2D display, resulting the switch between 2D display and 3D display.

Where the display panel have more than one desirable observation point, the display panel of the embodiment of the disclosure may further comprise a sensor, by which the location or position of the viewer can be detected; therefore, according to the location of the viewer, the display panel can determine to use which layer of patterned electrodes to provide a parallax barrier so that the desirable observation point of the currently used patterned electrodes closest to, preferably overlapped with, the location of the viewer. Compared with the existing naked-eye 3D display technology with a fixed desirable observation point, the embodiment of the disclosure comprises switchable parallax barriers to make the desirable observation point of a 3D display controllable; by incorporating a position sensor to track the location of the viewer, the embodiment can change its desirable observation point to always provide the viewer with a desirable observation point.

Because the display surface of the display unit according to the embodiment of the disclosure is provided with a parallax barrier and the transparency of the parallax barrier can be relatively low, when 3D display is obtained by rendering the parallax barrier in the transparency state, the display panel of the embodiment of the disclosure can adjust the brightness of the display unit when switching to 3D display, and increases the brightness of the display unit by for example at least 20% to ensure the display quality of 3D display.

The display unit of any of the embodiments of the disclosure may be, but not limited to, a liquid crystal display (LCD) display unit, an organic light-emitting display (OLED) display unit, or a plasma display panel (PDP) display unit. When naked-eye 3D display is needed, the pattern of the parallax barrier can be controlled to switch to the light-absorbing state, obtaining naked-eye 3D display; when 2D display is needed, the pattern of the parallax barrier 61 can be controlled to switch to the light-transmitting state, obtaining 2D display. Therefore, with the solution provided in the embodiment of the disclosure, switch between 2D display and 3D display can be realized with using natural light rather than polarized light.

In the embodiment of the disclosure, the display unit may be a polarizing glasses display unit, or may be provided with a polarized-light modulation plate on its display surface. The polarized-light modulation plate may be realized with a LCD unit or a phase plate.

As shown in FIG. 10 through FIG. 13, when the display unit is a polarizing glasses display unit, the display effect is described in the following.

Figure 10:
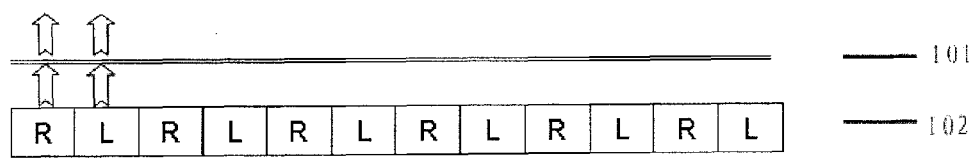
FIG. 10 shows a diagram of 2D display realized by the second embodiment of the disclosure.

First, as shown in FIG. 10, the parallax barrier 101 in the embodiment of the disclosure is controlled to be in the light-transmitting state, and the display unit 102 works in a 2D display mode to realize 2D display.

Figure 11:
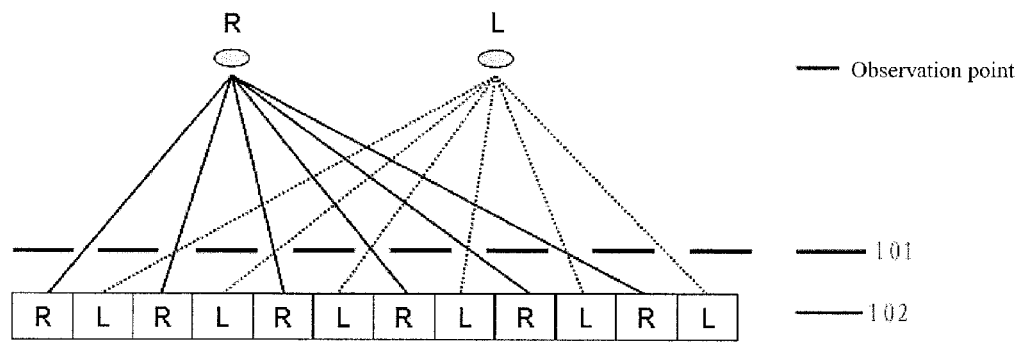
FIG. 11 shows a diagram of naked-eye 3D display realized by the second embodiment of the disclosure.

Second, as shown in FIG. 11, the parallax barrier 101 in the embodiment of the disclosure renders the regions of the patterned electrodes to be in a light-absorbing state, and the display unit 102 works in a 3D display mode to realize naked-eye 3D display.

Figure 12:
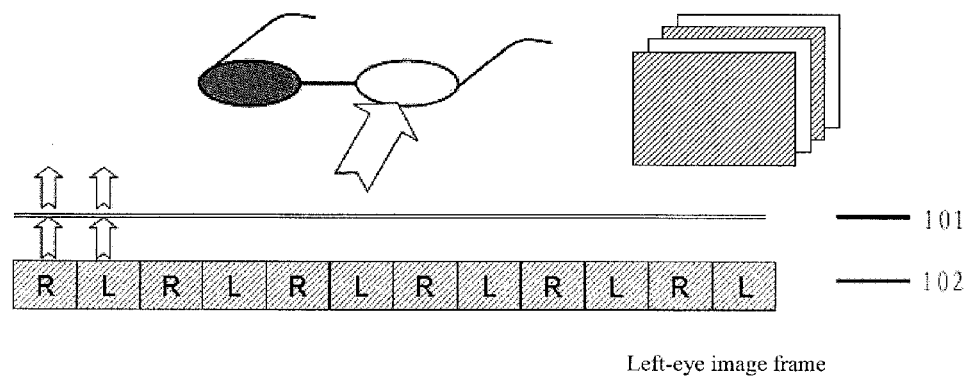
FIG. 12 shows a diagram of displaying a left-eye image frame of glass type 3D display according to the second embodiment of the disclosure.
Figure 13:
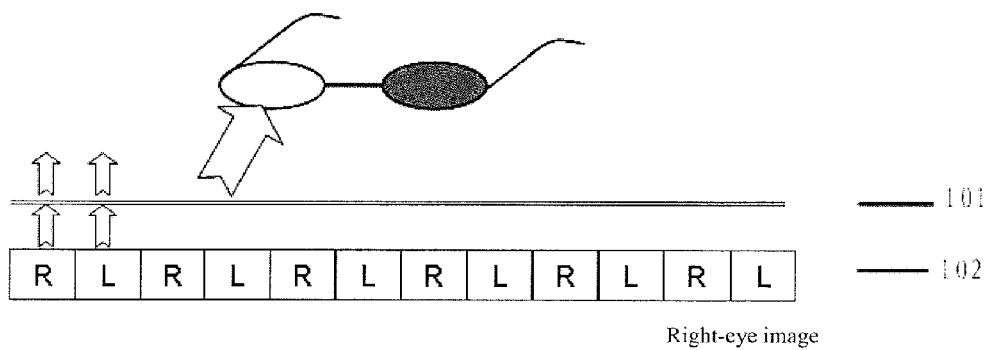
FIG. 13 shows a diagram of displaying a right-eye image frame of glass type 3D display according to the second embodiment of the disclosure.

Third, as shown in FIG. 12 and FIG. 13, the parallax barrier 101 in the embodiment of the disclosure is controlled to be in the light-transmitting state, and the display unit 102 works in a polarizing glasses 3D display mode to realize polarizing glasses 3D display. In FIG. 12, the left-eye image frame is displayed, the left-eye image pixels ("L" pixel) irradiates a kind of polarized light, which can pass through the left eyeglass of the polaroid glasses and then be received by the left eye of a user, and the left-eye image is felt by the human brain; in FIG. 13, the right-eye image frame is displayed, at this time the right-eye image pixels ("R" pixel) irradiates another kind of polarized light, which can pass through the right eyeglass of the polaroid glasses and then be received by the right eye of the user, and the right-eye image is felt in the human brain; and the left-eye image and the right-eye image are combined to establish a 3D image in the human brain finally.

Figure 14:
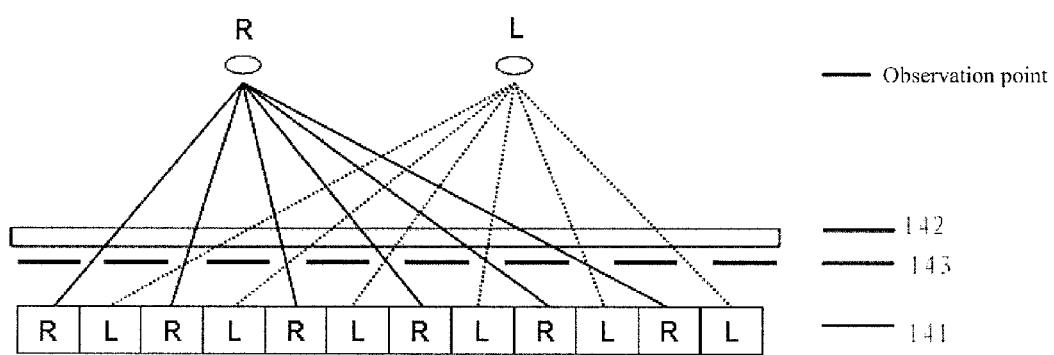
FIG. 14 shows a diagram of naked-eye 3D display with a polarized-light modulation plate according to the second embodiment of the disclosure.
Figure 15:
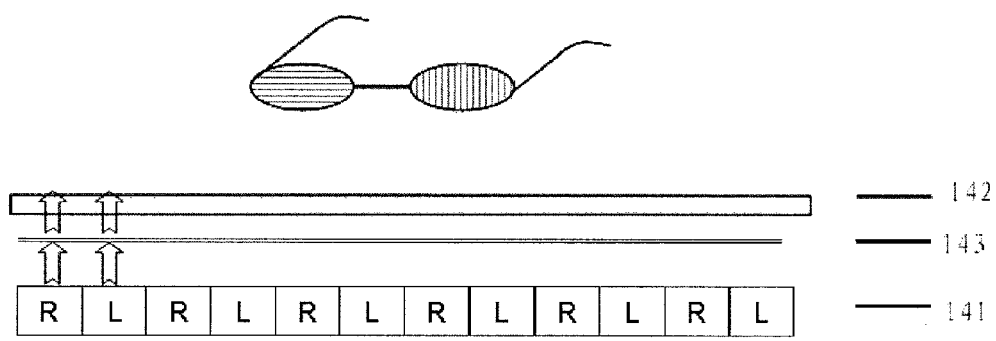
FIG. 15 shows a diagram of glass type 3D display with a polarized-light modulation plate according to the second embodiment of the disclosure.

As shown in FIG. 14 and FIG. 15, when the display unit 141 is provided with a polarized-light modulation plate 142 on its display surface, the display effect is described in the following.

First, in FIG. 14, the regions corresponding to the patterned electrodes of the parallax barrier 143 of the embodiment of the disclosure is controlled to be in the light-absorbing state to realize naked-eye 3D display.

Second, in FIG. 15, the regions corresponding to the patterned electrodes of the parallax barrier 143 of the embodiment of the disclosure is controlled to be in the light-transmitting state, and polarizing glasses 3D display can be realized with the polarized-light modulation plate.

Third Embodiment

This embodiment of the disclosure provides a method of manufacturing a parallax barrier capable of working with natural light, comprising the following steps.

Step 1, forming transparent electrodes on two transparent substrate respectively, wherein the transparent electrodes on one of the transparent substrate comprise a set of the patterned electrodes or at leas two set of patterned electrodes which can be energized independently; and Step 2, assembling together the two transparent substrates formed with the transparent electrodes, and filling liquid medium between the assembled transparent substrates, wherein when each set of the patterned electrodes are energized, the liquid medium in the regions corresponding to the energized patterned electrodes is changed into the non-transparency state, forming a light-absorbing state pattern having the same shape of the energized patterned electrode, or vice versa.

In the embodiment of the disclosure, the upper and lower transparent substrates are assembled together with sealant to form a cell, and the cell gap between the substrates can be controlled with spacers added into the sealant. In this embodiment, spacers of diameter of about 500 um can be adopted. Then, for example transparent liquid medium is filled between the two transparent substrates by a vacuum filling method; next the formed cell is sealed. The spacers may be ball spacers, post spacers or the like, and the scope of the disclosure is not limited thereto.

In manufacturing, the transparent electrode of the other transparent substrate in the two transparent substrates can be formed in plate to cover the entire transparent substrate; or the transparent electrodes of the other transparent substrate in the two transparent substrates can be formed in the pattern corresponding to that of the patterned electrodes on the previous-described transparent substrate.

In the embodiment, the material of the transparent electrode(s) can adopt indium tin oxide (ITO), indium zinc oxide (IZO), or the like; the process to form the transparent electrode(s) may comprise: first for example depositing a layer of transparent electrode material, and second patterning the layer to form the patterned electrodes in strip shape for example.

In order to realize switch of the regions corresponding to patterned electrodes between the light-transmitting state and the light-absorbing state, the embodiment of the disclosure may employ, but not limited to, an electrowetting method, an electrochromic method, or an electrochemistry deposition method, the principles of which are the same as that in the first embodiment, so detailed description is omitted herein.

The embodiment of the disclosure can be applicable to a parallax barrier and a display panel, especially to a display panel which needs switch between 3D and 2D display.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be comprised within the scope of the following claims.

What is claimed is:

1. A display panel, comprising:
   a display unit,
   a plurality of parallax barriers capable of working with natural light, wherein a display surface of the display unit is provided with the parallax barriers, wherein each of the parallax barriers comprising:
   a transparent barrier provided with at least two sets of patterns which are capable of switching between a light-absorbing state and a light-transmitting state, wherein when one set of the patterns are in the light-absorbing state, a slit grating for 3-dimensional display is formed on the transparent barrier, and the transparent barrier comprises:
   two transparent substrates that are assembled together to form a cell;
   liquid medium filled between the two transparent substrates; and
   transparent electrodes formed on the two transparent substrates respectively, wherein transparent electrodes on at least one of the transparent substrates comprise at least two sets of patterned electrodes which can be energized independently, and each set of patterned electrodes corresponds to one desirable observation point, and the liquid medium in regions corresponding to the patterned electrode can be present in light-absorbing state or the light-transmitting state under different conditions; and a sensor, wherein the sensor is configured to detect a location of a viewer; and according to the location of the viewer the display panel determines which set of patterned electrodes is to be used to provide a parallax barrier so that the desirable observation point of the used patterned electrodes is closest to the location of the viewer.

2. The display panel according to claim 1, wherein the display unit is a liquid crystal display unit, an organic light-emitting diode unit, or a plasma display panel unit.

3. The display panel according to claim 1, wherein the display unit is a polarizing glasses display unit, or
a display surface of the display unit is provided with a polarized-light modulation plate.

4. The display panel according to claim 1, wherein when each set of patterned electrodes are energized, the liquid medium in regions corresponding to the energized patterned electrodes is changed into a non-transparency state, forming a light-absorbing state pattern having a same shape as that of the energized patterned electrodes; or
when one set of patterned electrodes are de-energized, the liquid medium in regions corresponding to the de-energized patterned electrodes is changed into a non-transparency state, forming a light-absorbing state pattern having a same shape as that of the de-energized patterned electrodes.

5. The display panel according to claim 1, wherein
the liquid medium comprises colored oil drops and a transparent solution, and a medium layer that can produce electrowetting effect with the liquid medium is provided on the patterned electrodes; or
the liquid medium comprises a transparent electrolyte solution and an electrochromic compound that is dissolved in the electrolyte solution; or
the liquid medium comprises transparent electrolyte containing metal microparticles, when the patterned electrodes are energized, metal microparticles in the transparent electrolyte are deposited on the patterned electrodes, which results in a non-transparent light-absorbing state pattern.

6. The display panel according to claim 1, wherein according to the location of the viewer the display panel determines which set of patterned electrodes is to be used to provide a parallax barrier so that the desirable observation point of the used patterned electrodes is overlapped with the location of the viewer.

7. The display panel according to claim 1, wherein one set of patterned electrodes comprise electrodes in parallel to each other, and widths of the electrodes and intervals between adjacent electrodes are in accordance with the conditions of a slit grating for naked-eye 3D display.

8. The display panel according to claim 1, wherein at least one set of patterned electrodes are provided respectively in intervals of adjacent patterned electrodes of another set of patterned electrodes.

9. A method of manufacturing a display panel, comprising manufacturing a plurality of parallax barriers capable of working with natural light, wherein manufacturing each of the parallax barriers comprising:
forming transparent electrodes on two transparent substrates respectively, wherein transparent electrodes on at least one of the transparent substrates comprise at least two sets of patterned electrodes, each set of which can be energized independently, and each set of which corresponds to one desirable observation point;
assembling together the two transparent substrates formed with the transparent electrodes to form a cell, and filling liquid medium between the assembled transparent substrates, wherein when each set of the patterned electrodes are energized, the liquid medium in the regions corresponding to the energized patterned electrodes is changed into the non-transparency state, forming a light-absorbing state pattern having the same shape of the energized patterned electrode, or
when one set of patterned electrodes are de-energized, the liquid medium in regions corresponding to the de-energized patterned electrodes is changed into a non-transparency state, forming a light-absorbing state pattern having a same shape as that of the de-energized patterned electrodes, and
providing a sensor, wherein the sensor is configured to detect a location of a viewer, and according to the location of the viewer the display panel determines which set of patterned electrodes is to be used to provide a parallax barrier so that the desirable observation point of the used patterned electrodes is closest to the location of the viewer.

10. The method of manufacturing a display panel according to claim 9, wherein
the liquid medium comprises colored oil drops and a transparent solution, and a medium layer that can produce electrowetting effect with the liquid medium is provided on the patterned electrodes; or
the liquid medium comprises a transparent electrolyte solution and an electrochromic compound that is dissolved in the electrolyte solution; or
the liquid medium comprises transparent electrolyte containing metal microparticles, when the patterned electrodes are energized, metal microparticles in the transparent electrolyte are deposited on the patterned electrodes, which results in a non-transparent light-absorbing state pattern.

11. The method of manufacturing a display panel according to claim 9, wherein the transparent electrodes on one of the two transparent substrates cover the entirety of the transparent substrate; or
the transparent electrodes on one of the two transparent substrates correspond to the patterned electrodes formed on the other of the two transparent substrates.

* * * * *